United States Patent
Neishi et al.

(10) Patent No.: US 10,538,832 B2
(45) Date of Patent: Jan. 21, 2020

(54) STEEL FOR CARBONITRIDED BEARING

(71) Applicants: NIPPON STEEL & SUMITOMO METAL CORPORATION, Tokyo (JP); JTEKT CORPORATION, Osaka (JP)

(72) Inventors: Yutaka Neishi, Muroran (JP); Takahisa Suzuki, Muroran (JP); Tatsuya Koyama, Nishio (JP); Shingo Yamasaki, Kimitsu (JP); Kohei Kanetani, Kashiwara (JP); Takashi Sada, Kashiwara (JP)

(73) Assignees: NIPPON STEEL CORPORATION, Tokyo (JP); JTEKT CORPORATION, Osaka (JP)

( * ) Notice: Subject to any disclaimer, the term of this patent is extended or adjusted under 35 U.S.C. 154(b) by 0 days.

(21) Appl. No.: 15/328,131

(22) PCT Filed: Jul. 29, 2015

(86) PCT No.: PCT/JP2015/003799
§ 371 (c)(1),
(2) Date: Jan. 23, 2017

(87) PCT Pub. No.: WO2016/017162
PCT Pub. Date: Feb. 4, 2016

(65) Prior Publication Data
US 2017/0218489 A1    Aug. 3, 2017

(30) Foreign Application Priority Data
Jul. 29, 2014 (JP) ................. 2014-153944

(51) Int. Cl.
*C22C 38/22* (2006.01)
*C22C 38/32* (2006.01)
(Continued)

(52) U.S. Cl.
CPC ............ *C22C 38/32* (2013.01); *C21D 1/06* (2013.01); *C21D 6/002* (2013.01); *C21D 6/008* (2013.01);
(Continued)

(58) Field of Classification Search
CPC ....... C22C 38/32; C22C 38/06; C22C 38/001; C22C 38/002; C22C 38/02; C22C 38/04;
(Continued)

(56) References Cited

FOREIGN PATENT DOCUMENTS

| CN | 101821413 | 9/2010 |
| EP | 0 950 723 | 10/1999 |

(Continued)

OTHER PUBLICATIONS

Machine translation of JP2008280583 (Year: 2008).*

*Primary Examiner* — Haytham Soliman
(74) *Attorney, Agent, or Firm* — Clark & Brody

(57) ABSTRACT

Provided is a steel for carbonitrided bearing which excels in hardenability and also excels in toughness, wear resistance, and surface-originated flaking life after quenching and tempering. A steel for carbonitrided bearing of the present embodiment has a chemical composition containing, in mass %, C: 0.22 to 0.45%, Si: not more than 0.50%, Mn: 0.40 to 1.50%, P: not more than 0.015%, S: not more than 0.005%, Cr: 0.30 to 2.0%, Mo: 0.10 to 0.35%, V: 0.20 to 0.40%, Al: 0.005 to 0.10%, N: not more than 0.030%, and O: not more than 0.0015%, with the balance being Fe and impurities, and satisfying Formulae (1) and (2).

$$1.20 < 0.4Cr + 0.4Mo + 4.5V < 2.60 \quad (1)$$

$$2.7C + 0.4Si + Mn + 0.8Cr + Mo + V > 2.20 \quad (2)$$

4 Claims, 3 Drawing Sheets

(51) Int. Cl.
*C21D 9/40* (2006.01)
*C23C 8/80* (2006.01)
*C21D 1/06* (2006.01)
*C22C 38/24* (2006.01)
*F16C 33/62* (2006.01)
*C21D 6/00* (2006.01)
*C23C 8/32* (2006.01)
*C22C 38/00* (2006.01)
*C22C 38/02* (2006.01)
*C22C 38/04* (2006.01)
*C22C 38/06* (2006.01)
*C22C 38/26* (2006.01)
*C22C 38/28* (2006.01)
*C22C 38/12* (2006.01)

(52) U.S. Cl.
CPC .............. *C21D 9/40* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/22* (2013.01); *C22C 38/24* (2013.01); *C22C 38/26* (2013.01); *C22C 38/28* (2013.01); *C23C 8/32* (2013.01); *C23C 8/80* (2013.01); *F16C 33/62* (2013.01); *F16C 2204/66* (2013.01); *F16C 2204/70* (2013.01); *F16C 2223/16* (2013.01); *F16C 2240/90* (2013.01)

(58) Field of Classification Search
CPC ......... C22C 38/22; C22C 38/24; C22C 38/26; C22C 38/28; C21D 1/06; C21D 9/40; C23C 8/32; F16C 33/62; F16C 2223/16; F16C 2204/70
See application file for complete search history.

(56) References Cited

FOREIGN PATENT DOCUMENTS

| | | |
|---|---|---|
| JP | 06-287712 | 10/1994 |
| JP | 08-049057 | 2/1996 |
| JP | 11-12684 | 1/1999 |
| JP | 2008-280583 | 11/2008 |
| JP | 2008280583 A * | 11/2008 |

* cited by examiner

STEEL FOR CARBONITRIDED BEARING

TECHNICAL FIELD

The present invention relates to a steel for bearing, more particularly to a steel for carbonitrided bearing subjected to carbonitriding quenching and tempering.

BACKGROUND ART

Steel materials for medium-sized or large-sized bearing parts include bearing steels typified by SUJ3 and SUJ5 specified in JIS G 4805 (2008), and SNCM-based case hardening steels typified by SNCM815 specified in JIS G 4053 (2008). One example of the production process of bearing parts utilizing such steels is as follows. A steel material is subjected to hot working (for example, hot forging), and cutting to produce an intermediate product having a desired shape. The intermediate product is subjected to heat treatment so as to have predetermined hardness and microstructure. The heat treatment is quenching and tempering in the case of a bearing steel, and carburizing treatment (carburizing-quenching and tempering) in the case of a case hardening steel. A bearing part is produced by the processes described above.

For some bearing parts, excellent wear resistance and surface-originated flaking life are required. In such a case, as the above described heat treatment in the production process of bearing parts, carbonitriding treatment (carbonitriding-quenching and tempering) is performed in place of carburizing treatment. Carbonitriding treatment increases carbon and nitrogen concentrations in an outer layer of the steel material, thereby hardening the outer layer of the steel material.

Techniques relating to bearing parts or steel materials for bearing are proposed in Japanese Patent Application Publication Nos. 08-49057 (Patent Literature 1), 2008-280583 (Patent Literature 2), 11-12684 (Patent Literature 3), and 06-287712 (Patent Literature 4).

In Patent Literature 1, carburizing treatment or carbonitriding treatment is performed on a steel material containing a large amount of V (vanadium) to cause V carbide to precipitate in an outer layer. It discloses that this V carbide provides excellent wear resistance for a rolling bearing.

However, the V content in the steel material of Patent Literature 1 is as high as 0.8 to 2.0%. For that reason, performing carbonitriding treatment may cause coarse V carbides and V carbonitrides to be formed, thereby significantly deteriorating toughness of the bearing member.

In the case hardening steel for bearing disclosed in Patent Literature 2, paying attention to hydrogen embrittlement effect on bearing life, V carbides are finely dispersed, thereby increasing the effect of hydrogen trap site. It discloses that this increases surface fatigue strength.

However, in the technique proposed in Patent Literature 2, toughness may deteriorate along with the amounts of S and P contained in the steel material.

In the case hardening steel for cold forging disclosed in Patent Literature 3, for the purpose of cost reduction, the chemical components and microstructure of steel are adjusted to accelerate spheroidizing annealing treatment.

However, when producing a bearing by using the steel material proposed in Patent Literature 3, hardenability and toughness may be insufficient.

A steel part disclosed in Patent Literature 4 contains a large amount of retained austenite in an outer layer as a result of performing carbonitriding quenching. It is stated that as a result of this, a surface-originated flaking life is improved.

However, the steel material of Patent Literature 4 contains not less than 0.5% of expensive Ni. For that reason, its production cost increases when applied to medium-sized and large-sized bearing parts.

In recent years, there is growing demand for longer lives of bearing parts under impact environments, poor lubrication environments, and high interfacial pressure conditions, and it is desired to establish enabling technology which excels in toughness, wear resistance, and surface-originated flaking life. A conventional practice to increase toughness and surface-originated flaking life has been to perform carburizing or carbonitriding on a case hardening steel typified by SCM and SNCM of JIS G 4053 (2008), and a case hardening steel in which alloy elements such as Si, Mn, Mo, and V are optimized, thereby increasing the retained austenite. However, since the retained austenite is a soft structure, increase in the amount of retained austenite will deteriorate wear resistance.

CITATION LIST

Patent Literature

Patent Literature 1: Japanese Patent Application Publication No. 08-49057
Patent Literature 2: Japanese Patent Application Publication No. 2008-280583
Patent Literature 3: Japanese Patent Application Publication No. 11-12684
Patent Literature 4: Japanese Patent Application Publication No. 06-287712

SUMMARY OF INVENTION

An object of the present invention is to provide a steel for carbonitrided bearing which, without containing Ni, excels in hardenability and also excels in toughness, wear resistance and surface-originated scaling life after heat treatment.

A steel for carbonitrided bearing of the present embodiment has a chemical composition containing, in mass %, C: 0.22 to 0.45%, Si: not more than 0.50%, Mn: 0.40 to 1.50%, P: not more than 0.015%, S: not more than 0.005%, Cr: 0.30 to 2.0%, Mo: 0.10 to 0.35%, V: 0.20 to 0.40%, Al: 0.005 to 0.10%, N: not more than 0.030%, O: not more than 0.0015%, B: 0 to 0.0050%, Nb: 0 to 0.10%, and Ti: 0 to 0.10%, with the balance being Fe and impurities, and satisfying Formulae (1) and (2).

$$1.20 < 0.4Cr + 0.4Mo + 4.5V < 2.60 \quad (1)$$

$$2.7C + 0.4Si + Mn + 0.8Cr + Mo + V > 2.20 \quad (2)$$

The steel for carbonitrided bearing of the present embodiment excels in hardenability and also excels in toughness, wear resistance and surface-originated scaling life after heat treatment.

DESCRIPTION OF EMBODIMENTS

Figure 1:
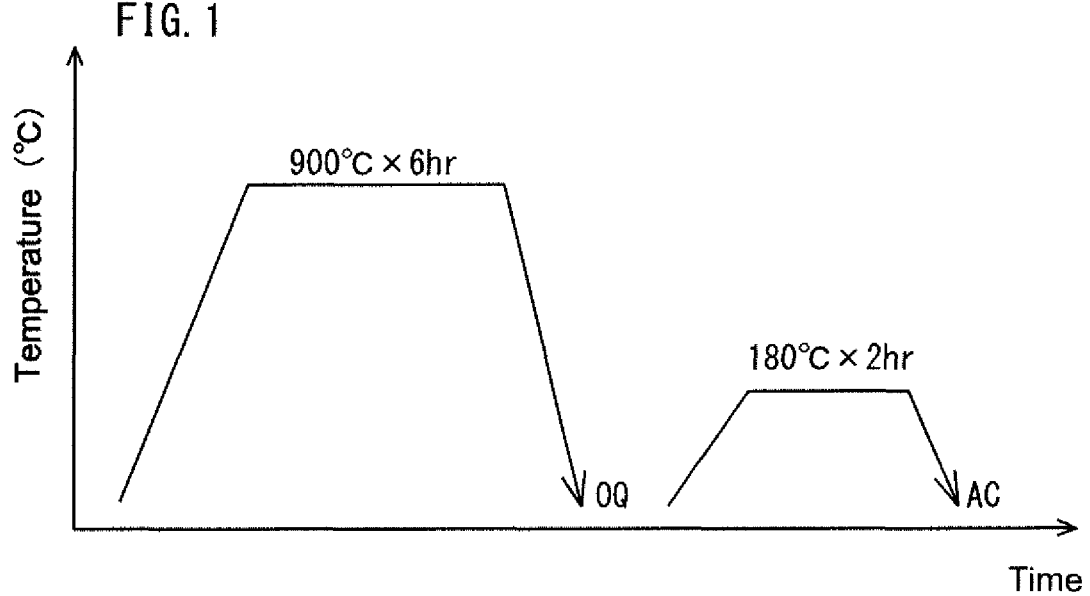
FIG. 1 is a diagram to show a heat pattern of quenching and tempering performed on test specimens for hardenability evaluation test and toughness evaluation test in Example 1.

The present inventors have conducted investigation and examination on the effects of chemical components of steel, particularly C, Si, Cr, Mo, and V on the hardenability, toughness, wear resistance, and surface-originated flaking life of steel for carbonitrided bearing. As a result, the present inventors have obtained the following findings.

[Wear Resistance and Surface-Originated Flaking Life]

To perform surface hardening treatment such as carbonitriding quenching and tempering on steel material thereby improving the wear resistance of the steel material, it is effective that fine V precipitates such as V carbides and V carbonitrides are dispersed in an outer layer of the steel material. However, the wear resistance is also affected by the surface hardness of steel material after surface hardening treatment, and the amount of retained austenite in steel material. Therefore, to improve wear resistance, it is effective to adjust the contents of V, Cr, and Mo which affect the surface hardness and the amount of retained austenite with V-based precipitates being finely dispersed.

V forms carbides and carbonitrides (hereafter, referred to as carbonitrides, etc.). Therefore, increasing the V content will improve the wear resistance of carbonitrided bearing members. However, when the V content is too high, the hot ductility of steel material will deteriorate, and cracking becomes more likely to occur during hot working (during hot rolling and hot forging). Further, when coarse carbonitrides, etc. are present in steel material, the toughness of a core part of a bearing part after carbonitriding treatment deteriorates. Further, if coarse carbonitrides, etc. remain in a bearing part, these coarse precipitates act as sources of stress concentration. In this case, these coarse precipitates act as starting points of fatigue, decreasing the surface-originated flaking life.

By adjusting the balance among the V, Cr, and Mo contents while suppressing the V content, formation of the above described coarse carbonitrides, etc. is suppressed. Hereinafter, this point will be described in detail.

To make precipitates such as carbides and carbonitrides be finely dispersed, it is effective to increase the site for generating nuclei of precipitates (precipitation nuclei). Containing V, Cr, and Mo in combination will result in increase in precipitation nuclei generation sites, and a large number of carbonitrides, etc. precipitate. However, if these carbonitrides, etc. remain undissolved in a heating process before hot rolling and hot forging, the remained carbonitrides, etc. are coarsened in carbonitriding treatment. In this case, the surface-originated flaking life decreases. Therefore, carbonitrides, etc. are made to be sufficiently dissolved in a heating process before hot rolling and hot forging.

To dissolve carbonitrides, etc., heating temperature may be increased. However, increasing the heating temperature will cause coarsening of microstructure (crystal grains), thereby deteriorating the toughness of steel material. Moreover, the upper limit of heating temperature is limited by the restriction on facilities. Therefore, it is effective to adjust the V, Cr, and Mo contents such that carbonitrides, etc. are sufficiently dissolved, while suppressing deterioration of toughness.

As a result of conducting investigation and examination depending on the assumption described so far, the present inventors have found that if the chemical composition of a steel for carbonitrided bearing satisfies the following Formula (1), it is possible to increase wear resistance while suppressing decrease in surface-originated flaking life and deterioration of toughness:

$$1.20 < 0.4Cr + 0.4Mo + 4.5V < 2.60 \tag{1}$$

where, each element in Formula (1) is substituted by the content (mass %) of a corresponding element.

It is defined as $fn1 = 0.4Cr + 0.4Mo + 4.5V$. When $fn1$ is not more than 1.20, the precipitation nuclei generation site becomes deficient in number. In this case, precipitation of fine carbonitrides, etc. becomes insufficient, thus deteriorating wear resistance. On the other hand, when $fn1$ is not less than 2.60, although wear resistance is improved, undissolved coarse carbonitrides, etc. will remain. For that reason, surface-originated flaking life decreases and toughness deteriorates.

[Hardenability]

For a steel for carbonitrided bearing which is the starting material of a carbonitrided bearing part produced by performing carbonitriding treatment, high hardenability is required. When the chemical composition of the steel for carbonitrided bearing satisfies Formula (2), the bearing part can be sufficiently quenched and high strength can be obtained even if it is large sized:

$$2.7C + 0.4Si + Mn + 0.8Cr + Mo + V > 2.20 \tag{2}$$

where, each element in Formula (2) is substituted by the content (mass %) of a corresponding element. It is defined as $fn2 = 2.7C + 0.4Si + Mn + 0.8Cr + Mo + V$. Each element specified in $fn2$ improves hardenability of steel. Therefore, when $fn2$ is more than 2.20, sufficient hardenability is obtained, and strength necessary to improve wear resistance can be obtained in a bearing part.

[Toughness]

For a medium-sized and large-sized bearing part, excellent toughness (fracture toughness), as well as excellent wear resistance and surface-originated flaking life, is required. The fracture toughness of a steel material having a structure dominantly made up of tempered martensite is affected mainly by the strength of tempered martensite structure, C content which affects the substructure, P content which causes grain boundary embrittlement, and the amount of sulfides in steel material.

Therefore, to obtain strength and fracture toughness required for a medium-sized and large-sized bearing part, C content is made to be not less than 0.22%. Further, to improve fracture toughness, P content is limited to be not more than 0.015%. Moreover, sulfides deteriorate surface-originated flaking life. Therefore, S content is limited to be not more than 0.005%.

A steel for carbonitrided bearing according to the present embodiment, which has been completed based on the above described findings, has a chemical composition containing, in mass %, C: 0.22 to 0.45%, Si: not more than 0.50%, Mn: 0.40 to 1.50%, P: not more than 0.015%, S: not more than 0.005%, Cr: 0.30 to 2.0%, Mo: 0.10 to 0.35%, V: 0.20 to 0.40%, Al: 0.005 to 0.10%, N: not more than 0.030%, O: not more than 0.0015%, B: 0 to 0.0050%, Nb: 0 to 0.10%, and Ti: 0 to 0.10%, with the balance being Fe and impurities, and satisfying Formulae (1) and (2).

$$1.20 < 0.4Cr + 0.4Mo + 4.5V < 2.60 \tag{1}$$

$$2.7C + 0.4Si + Mn + 0.8Cr + Mo + V > 2.20 \tag{2}$$

In Formulae (1) and (2), each symbol of element is substituted by the content (mass %) of the corresponding element.

The chemical composition of the above described steel for carbonitrided bearing may contain B: 0.0003 to 0.0050%, Nb: 0.005 to 0.10%, and Ti: 0.005 to 0.10%.

Hereinafter, the steel for carbonitrided bearing of the present embodiment will be described in detail. Symbol "%" relating to chemical elements means mass % unless otherwise stated.

[Chemical Composition of Steel for Carbonitrided Bearing]

The chemical composition of the steel for carbonitrided bearing contains the following elements.

C: 0.22 to 0.45%

Carbon (C) improves hardenability of steel. Therefore, C increases the strength and toughness of a core part of a carbonitrided bearing part which is obtained from steel for carbonitrided bearing by subjecting it to carbonitriding quenching and tempering. C further increases surface-originated flaking life of the carbonitrided bearing part. When the C content is too low, these effects cannot be achieved. On the other hand, when the C content is too high, coarse carbides and carbonitrides (carbonitrides, etc.) remain even after hot working, thereby deteriorating the toughness and surface-originated flaking life of the carbonitrided bearing part. Therefore, the C content is 0.22 to 0.45%. The lower limit of the C content is preferably 0.24%, and more preferably 0.25%. The upper limit of the C content is preferably 0.44%, and more preferably 0.42%.

Si: Not More than 0.50%

Silicon (Si) is inevitably contained in steel. Si increases the strength of steel. Si further improves the surface-originated flaking life of a carbonitrided bearing part. However, when the Si content is too high, the hardness of base metal becomes too high, thereby decreasing the tool life during cutting. When the Si content is too high, the toughness and hot workability of steel material deteriorate. Therefore, the Si content is not more than 0.50%. The lower limit of the Si content is preferably 0.01%, more preferably 0.02%, and further preferably 0.05%. The upper limit of the Si content is preferably 0.35%, and with cold workability taken into consideration, more preferably 0.10%.

Mn: 0.40 to 1.50%

Manganese (Mn) improves hardenability of steel, and further increases the surface-originated flaking life of a carbonitrided bearing part. When the Mn content is too low, these effects cannot be achieved. On the other hand, when the Mn content is too high, the hardness of base metal becomes too high, thus decreasing tool life during cutting. When the Mn content is too high, the toughness may deteriorate, and quenching crack may occur during quenching. Therefore, the Mn content is 0.40 to 1.50%. The lower limit of the Mn content is preferably 0.45%, and more preferably 0.48%. The upper limit of the Mn content is preferably 1.30%, more preferably 1.00%, and further preferably 0.75%.

P: Not More than 0.015%

Phosphorous (P) is an impurity. P segregates at grain boundaries, thereby deteriorating toughness of a carbonitrided bearing part. Therefore, the P content is not more than 0.015%. The upper limit of the P content is preferably 0.013%, and more preferably 0.010%. The P content is preferably as low as possible.

S: Not More than 0.005%

Sulfur (S) is an impurity. S forms sulfide in steel, thereby deteriorating the surface-originated flaking life of a carbonitrided bearing part. Therefore, the S content is not more than 0.005%. The upper limit of the S content for further increasing the surface-originated flaking life is preferably 0.004%, and more preferably 0.003%. The S content is preferably as low as possible.

Cr: 0.30 to 2.0%

Chromium (Cr) improves hardenability of steel, and increases the strength of a carbonitrided bearing part. Cr further facilitates formation of fine precipitates during carbonitriding treatment (carbonitriding quenching and tempering) by being contained in combination with V and Mo, thereby improving wear resistance of the carbonitrided bearing part. When the Cr content is too low, these effects cannot be achieved. On the other hand, when the Cr content is too high, the carburizing property during carbonitriding treatment deteriorates. Therefore, the Cr content is 0.30 to 2.0%. The lower limit of the Cr content is preferably 0.50%, and more preferably 0.60%. The upper limit of the Cr content is preferably 1.8%, and more preferably 1.7%.

Mo: 0.10 to 0.35%

Molybdenum (Mo) improves hardenability of steel in the same way as Cr. Mo further facilitates formation of fine precipitates during carbonitriding treatment by being contained in combination with V and Cr, thereby improving wear resistance of the carbonitrided bearing part. When the Mo content is too low, these effects cannot be achieved. On the other hand, when the Mo content is too high, hot workability and machinability of steel deteriorate, and in addition to that, production cost increases. Therefore, the Mo content is 0.10 to 0.35%. The lower limit of the Mo content is preferably 0.20%, and more preferably 0.22%. The upper limit of the Mo content is preferably 0.30%, and more preferably 0.28%.

V: 0.20 to 0.40%

Vanadium (V) improves hardenability of steel in the same way as Cr and Mo. V further combines with C and N to form fine precipitates (carbonitrides, etc.). In the present embodiment, as a result of V, Cr, and Mo being contained in combination, fine precipitates are formed in a large number during carbonitriding treatment, thereby improving wear resistance of a carbonitrided bearing part. When the V content is too low, these effects cannot be achieved. On the other hand, when the V content is too high, undissolved coarse carbides etc. remain even after hot working, and toughness and surface-originated flaking life of the carbonitrided bearing part deteriorate. Further, hot workability and machinability of steel also deteriorate. Therefore, the V content is 0.20 to 0.40%. The lower limit of the V content is preferably 0.21%, and more preferably 0.22%. The upper limit of the V content is preferably 0.38%, and more preferably 0.36%.

Al: 0.005 to 0.10%

Aluminum (Al) deoxidizes steel. When the Al content is too low, this effect cannot be achieved. On the other hand, when the Al content is too high, coarse oxide-based inclusions remain in steel, thereby deteriorating surface-originated flaking life of a carbonitrided bearing part. Therefore, the Al content is 0.005 to 0.10%. The lower limit of the Al content is preferably 0.008%, and more preferably 0.010%. The upper limit of the Al content is preferably 0.050%, and more preferably 0.048%. The term "Al content" as used herein means the content of total Al.

N: Not More than 0.030%

Nitrogen (N) is an impurity. N dissolves into steel, thereby deteriorating hot workability of steel. Therefore, the N content is not more than 0.030%. The upper limit of the N content is preferably 0.025%, and more preferably 0.020%. The N content is preferably as low as possible.

O (Oxygen): Not More than 0.0015%

Oxygen (O) is an impurity. O combines with other elements in steel to form oxides, thereby decreasing the strength of steel material. Further, O forms oxides as well as facilitates coarsening of MnS, thereby decreasing surface-originated flaking life of a carbonitrided bearing part. Therefore, the O content is not more than 0.0015%. The upper limit of the O content is preferably 0.0013%, and more preferably 0.0012%. The O content is preferably as low as possible.

The balance of the chemical composition of a steel for carbonitrided bearing according to the present embodiment consists of Fe and impurities. Herein, the term impurity means those which are introduced from ores and scraps as raw materials, or production environments when industrially producing steel for carbonitrided bearing, and those which are permitted within a range not adversely affecting the steel for carbonitrided bearing of the present embodiment.

The chemical composition of a steel for carbonitrided bearing of the present embodiment may further contain one or more kinds selected from the group consisting of B, Nb, and Ti. These elements are optional elements, and all of them increase the strength of the carbonitrided bearing.

B: 0 to 0.0050%

Boron (B) is an optional element, and may not be contained. When contained, B improves hardenability of steel, and increases the strength of a carbonitrided bearing part. Further, B restricts P and S from segregating at austenite grain boundaries during quenching. However, when the B content is too high, B nitride (BN) is formed, thereby deteriorating toughness of steel. Therefore, the B content is 0 to 0.0050%. The lower limit of the B content is preferably 0.0003%, more preferably 0.0005%, and further preferably 0.0010%. The upper limit of the B content is preferably 0.0030%, and more preferably 0.0025%.

Nb: 0 to 0.10%

Niobium (Nb) is an optional element, and may not be contained. When contained, Nb combines with C and N in steel to form carbides, nitrides, and carbonitrides. These precipitates refine crystal grains and increase the strength of a carbonitrided bearing part by precipitation strengthening. However, when the Nb content is too high, toughness of steel deteriorates. Therefore, the Nb content is 0 to 0.10%. The lower limit of the Nb content is preferably 0.005%, and more preferably 0.010%. The upper limit of the Nb content is preferably 0.080%, and more preferably 0.070%.

Ti: 0 to 0.10%

Titan (Ti) is an optional element, and may not be contained. When contained, Ti forms carbides, nitrides, and carbonitrides, and refines crystal grains in the same way as Nb, thereby increasing the strength of carbonitrided bearing part. However, when the Ti content is too high, toughness of steel deteriorates. Therefore, the Ti content is 0 to 0.10%. The lower limit of the Ti content is preferably 0.005%, and more preferably 0.010%. The upper limit of the Ti content is preferably 0.080%, and more preferably 0.070%.

[Formula (1)]

The chemical composition of a steel for carbonitrided bearing of the present embodiment further satisfies Formula (1):

$$1.20 < 0.4Cr + 0.4Mo + 4.5V < 2.60 \quad (1)$$

where, each symbol of element in Formula (1) is substituted by the content (mass %) of a corresponding element.

Cr, Mo, and V generate precipitation nuclei generation sites, and facilitate formation of precipitates such as carbonitrides, etc. It is defined as $fn1 = 0.4Cr + 0.4Mo + 4.5V$. When fn1 is not more than 1.20, since the precipitation nuclei generation site is deficient in number, it is not likely that fine carbonitrides, etc. are formed. For that reason, wear resistance of a carbonitrided bearing part deteriorates. On the other hand, when fn1 is not less than 2.60, the precipitation nuclei generation sites are sufficient in number and wear resistance is improved; however, undissolved coarse carbonitrides, etc. remain in steel even after hot working. In this case, coarse carbonitrides, etc. further grow to be coarsened at the time of carbonitriding quenching and tempering. For that reason, the surface-originated flaking life and toughness of the carbonitrided bearing part deteriorate. Therefore, the lower limit of fn1 is more than 1.20, and the upper limit of fn1 is less than 2.60. The lower limit of fn1 is preferably 1.22. The upper limit of fn1 is preferably 2.58.

[Formula (2)]

The chemical composition of a steel for carbonitrided bearing of the present embodiment further satisfies Formula (2):

$$2.7C + 0.4Si + Mn + 0.8Cr + Mo + V > 2.20 \quad (2)$$

where, each symbol of element in Formula (2) is substituted by the content (mass %) of a corresponding element.

It is defined as $fn2 = 2.7C + 0.4Si + Mn + 0.8Cr + Mo + V$. Any of the elements in fn2 improves hardenability of steel. Therefore, fn2 is an index of the hardenability of steel for carbonitrided bearing and the strength of a carbonitrided bearing part.

When fn2 is not more than 2.20, hardenability of steel is too low. In this case, the hardness of a core part of a carbonitrided bearing part decreases, and thereby the strength of a carbonitrided bearing part decreases. Therefore, fn2 is more than 2.20. In this case, the strength of a carbonitrided bearing part is sufficiently increased. The lower limit of fn2 is preferably 2.70, and more preferably 3.20.

[Production Method]

A production method of the above described steel for carbonitrided bearing, and one example of the production method of a carbonitrided bearing part which is produced by using the steel for carbonitrided bearing will be described.

[Production Method of Steel Material for Carbonitrided Bearing]

Molten steel having the above described chemical composition and satisfying Formulae (1) and (2) is formed into a cast piece by a continuous casting process. The molten steel may be formed into an ingot by an ingot-making process. The cast piece or the ingot is subjected to hot working to produce a billet. For example, the cast piece or the ingot is formed into a billet by billeting. The billet or the cast piece is subjected to hot working to produce a steel material for carbonitrided bearing, such as steel bars or wire rods, etc. The hot working may be hot rolling or hot forging (hot extend forging, etc.). As needed, soaking diffusion treatment may be performed on the billet or cast piece before hot rolling. As needed, normalizing treatment or spheroidizing annealing treatment may be performed on the produced steel material for carbonitrided bearing. By the processes described so far, steel material for carbonitrided bearing is produced.

[Production Method of Carbonitrided Bearing Part]

A carbonitrided bearing part is produced by using the above described steel for carbonitrided bearing. First, a steel material for carbonitrided bearing is processed into a predetermined shape to produce an intermediate product. The processing method, is for example, hot forging or machining. An example of the machining is cutting.

The produced intermediate product is subjected to carbonitriding quenching and tempering to produce a carbonitrided bearing part. In the carbonitriding quenching, the intermediate product is heated to and retained at not less than $A_3$ transformation point in an atmospheric gas containing carburizing gas and ammonia gas, thereafter being rapidly cooled. In the tempering treatment, the intermediate product which has been subjected to carbonitriding quenching is retained within a temperature range of 100 to 500° C. for a predetermined time period.

The surface C concentration, surface N concentration, and surface hardness of the carbonitrided bearing part are adjusted by controlling the conditions of carbonitriding quenching and tempering. Specifically, the surface C concentration and the surface N concentration are adjusted by controlling carbon potential and ammonia concentration etc. of the atmosphere during carbonitriding quenching.

Specifically, the surface C concentration is adjusted mainly by the carbon potential, heating temperature, and retention time of carbonitriding quenching. As the carbon potential increases, the heating temperature increases, or the retention time increases, the surface C concentration increases. On the other hand, as the carbon potential decreases, the heating temperature decreases, or the retention time decreases, the surface C concentration decreases.

The surface N concentration is adjusted mainly by the ammonia concentration, heating temperature, and retention time of carbonitriding quenching. As the ammonia concentration increases, the heating temperature decreases, or the retention time increases, the surface N concentration increases. On the other hand, as the ammonia concentration decreases, the heating temperature increases, or the retention time decreases, the surface N concentration decreases. Note that as the surface N concentration increases, a larger amount of retained austenite is produced, thereby decreasing the surface hardness.

The surface hardness relates to the surface C concentration and the surface N concentration. Specifically, as either the surface C concentration or the surface N concentration increases, the surface hardness increases as well. On the other hand, as either of the surface C concentration and the surface N concentration decreases, the surface hardness decreases as well. However, when the surface N concentration is too high, the surface hardness decreases caused by retained austenite.

The surface hardness which has increased due to carbonitriding quenching can be decreased by tempering. Increasing the tempering temperature, or increasing the retention time at the tempering temperature will result in decrease in the surface hardness. Decreasing the tempering temperature or decreasing the retention time at the tempering temperature allows to maintain a high surface hardness.

Preferable conditions for carbonitriding quenching are as follows.

Carbon Potential CP in Atmosphere: 0.7 to 1.4

When the carbon potential CP in the atmosphere is too low, the C concentration at the surface of a carbonitrided bearing part becomes less than 0.7%. In this case, it is not possible to disperse a sufficient amount of carbonitrides, and therefore wear resistance deteriorates. On the other hand, when the carbon potential CP is too high, the surface C concentration becomes more than 1.2%. In this case, since coarse carbonitrides remain, the surface-originated flaking life decreases. Therefore, the carbon potential CP is 0.7 to 1.4.

Ammonia Concentration with Respect to a Flow Rate of Carburizing Converted Gas in the Atmosphere: 1 to 6%

When the ammonia concentration with respect to the flow rate of carburizing converted gas in the atmosphere is too low, the N concentration at the surface of a carbonitrided bearing part becomes less than 0.15%. In this case, it is not possible to disperse a sufficient amount of carbonitrides, and therefore wear resistance deteriorates. On the other hand, when the ammonia concentration it too high, the surface N concentration will be more than 0.6%. In this case, since coarse carbonitrides remain, the surface-originated flaking life decreases. Therefore, the ammonia concentration is 1 to 6%.

Retention Temperature During Carbonitriding (Carbonitriding Temperature): 830 to 930° C.

Retention Time at Carbonitriding Temperature: Not Less than 3 Hours

When the carbonitriding temperature is too low, the diffusion velocities of C and N decrease. In this case, the treating time to achieve predetermined heat treatment properties increases, thus increasing manufacturing cost. On the other hand, when the carbonitriding temperature is too high, the ammonia in the atmosphere decomposes, thus decreasing the N quantity that is introduced into steel material, and the dissolved amount of thus introduced C and N into the steel material matrix increases. In this case, it is not possible to disperse sufficient amount of carbonitrides, and thereby wear resistance deteriorates. Therefore, the carbonitriding temperature is 830 to 930° C.

The retention time at the carbonitriding temperature is made to be not less than 3 hours to ensure a sufficient C concentration and N concentration at the surface of steel. Note that as the retention time increases, C and N diffuse deeper into steel. Therefore, the retention time may be increased as needed.

Quenching Temperature: 830 to 930° C.

Retention Time at Quenching Temperature: Not More than 1 Hour

When the quenching temperature is too low, it is not possible to make sufficient C dissolved in steel, and thereby the hardness of steel decreases. On the other hand, when the quenching temperature is too high, it becomes likely that the crystal grains are coarsened and coarse carbonitrides precipitate along grain boundaries. In this case, the function as a rolling bearing deteriorates. Therefore, the quenching temperature is 830 to 930° C.

The retention time at a quenching temperature may be any time not less than that is needed for the entire intermediate product to become a predetermined quenching temperature. However, when the retention time at the quenching temperature is more than 1 hour, crystal grains become coarse. Therefore, the retention time at the quenching temperature is within 1 hour.

Preferable conditions of tempering are as follows.

Tempering Temperature: 150 to 200° C.

Retention Time at Tempering Temperature: 0.5 to 4 Hours

When the tempering temperature is too low, sufficient toughness will not be achieved. On the other hand, the tempering temperature is too high, the surface hardness decreases, and the wear resistance of the carbonitrided bearing part deteriorates. Therefore, the tempering temperature is 150 to 200° C.

When the retention time at the tempering temperature is too short, sufficient toughness will not be achieved. On the other hand, when the retention time is too long, the surface hardness decreases, and the wear resistance of the carbonitrided bearing part deteriorates. Therefore, the retention time at the tempering temperature is 0.5 to 4 hours.

[Concentration, N Concentration, and Rockwell C Hardness at Surface of Carbonitrided Bearing Part]

The C concentration, N concentration, and Rockwell C hardness HRC at a surface of carbonitrided bearing part which is produced by the above described production processes are as follows.

C Concentration at Surface: 0.7 to 1.2% in Mass %

The C concentration at a surface of a carbonitrided bearing part, which is produced by being subjected to carbonitriding quenching and tempering at the above described conditions, is 0.7 to 1.2%. When the C concentration at surface is too low, the surface hardness becomes too low, thereby deteriorating wear resistance. On the other hand, when the C concentration at surface is too high, coarse carbonitrides etc. remain, and thereby, the surface-originated flaking life decreases. When the C concentration at surface is 0.7 to 1.2%, wear resistance and surface-originated flaking life are excellent. The lower limit of the C concentration at surface is preferably 0.75%, and more preferably 0.80%. The upper limit of the C concentration at surface is preferably 1.1%, more preferably 1.05%, and further preferably 1.00%.

N Concentration at Surface: 0.15 to 0.6% in Mass %

The N concentration at surface of a carbonitrided bearing part produced by carbonitriding quenching and tempering is 0.15 to 0.6%. When the N concentration at surface is too low, the amount of retained austenite after carbonitriding quenching becomes too small, and further formation of fine carbonitrides is restricted, thereby deteriorating wear resistance. On the other hand, when the N concentration at surface is too high, retained austenite is produced excessively. In this case, the hardness at surface of the carbonitrided bearing part decreases, and thereby the strength and the surface-originated flaking life thereof rather decrease. When the N concentration at surface is 0.15 to 0.6%, the wear resistance and the surface-originated flaking life are excellent. The lower limit of the N concentration at surface is preferably 0.18%, and more preferably 0.20%. The upper limit of the N concentration at surface is preferably 0.58%, more preferably 0.56%, and further preferably 0.54%.

The C concentration and N concentration at surface are measured by the following method. By using an electron probe micro-analyzer (EPMA), at any surface position of a carbonitrided bearing part, the C concentration and N concentration are measured at a 1.0 μm pitch from the surface to a depth of 100 μm. An average of the measured C concentrations is defined as a surface C concentration (mass %). Similarly, an average of the measured N concentrations is defined as a surface N concentration (mass %).

Rockwell C Hardness HRC at Surface: 58 to 65

The Rockwell C hardness HRC at a surface of a carbonitrided bearing part is 58 to 65. When the Rockwell C hardness HRC at surface is less than 58, the wear resistance deteriorates and further the surface-originated flaking life decreases. On the other hand, when the Rockwell C hardness at surface is more than 65, crack propagation susceptibility when a minute crack is generated increases, and the surface-originated flaking life rather decreases. When the Rockwell C hardness at surface is 58 to 65, excellent wear resistance and excellent surface-originated flaking life can be achieved. The lower limit of the Rockwell C hardness at surface is preferably 58.5, and more preferably 59.0. The upper limit of the Rockwell C hardness at surface is preferably 64.5, and more preferably 64.3.

The Rockwell C hardness HRC of a carbonitrided bearing part is measured by the following method. Of the surfaces of the carbonitrided bearing part, any 4 measurement positions are determined. At the determined 4 measurement positions, the Rockwell hardness test using the C scale is performed conforming to JIS Z2245 (2011). An average of obtained Rockwell C hardnesses HRC is defined as a Rockwell C hardness HRC at surface.

By the production processes described so far, the above described steel for carbonitrided bearing and carbonitrided bearing part are produced. Hereinafter, the present invention will be described in more detail by way of an example.

EXAMPLE

Molten steels having various chemical compositions as shown in Table 1 were produced by using a converter.

[Table 1]

TABLE 1

| Steel Type | Chemical composition (mass %), Balance: Fe and impurities | | | | | | | | | | | | | | | |
|---|---|---|---|---|---|---|---|---|---|---|---|---|---|---|---|---|
| | C | Si | Mn | P | S | Cr | Mo | V | Al | N | O | B | Nb | Ti | fn1 | fn2 |
| A | 0.29 | 0.05 | 1.30 | 0.012 | 0.003 | 0.89 | 0.19 | 0.40 | 0.033 | 0.0070 | 0.0009 | | | | 2.23 | 3.41 |
| B | 0.40 | 0.07 | 0.70 | 0.007 | 0.003 | 1.21 | 0.25 | 0.31 | 0.026 | 0.0080 | 0.0011 | | | | 1.98 | 3.34 |
| C | 0.36 | 0.10 | 0.68 | 0.010 | 0.003 | 1.35 | 0.10 | 0.37 | 0.010 | 0.0095 | 0.0010 | | 0.10 | | 2.25 | 3.24 |
| D | 0.33 | 0.08 | 0.50 | 0.007 | 0.003 | 0.60 | 0.12 | 0.21 | 0.035 | 0.0090 | 0.0009 | 0.0005 | | | 1.23 | 2.23 |
| E | 0.35 | 0.10 | 0.80 | 0.009 | 0.003 | 1.95 | 0.28 | 0.37 | 0.040 | 0.0070 | 0.0009 | | | 0.08 | 2.56 | 4.00 |
| F | 0.25 | 0.28 | 0.61 | 0.008 | 0.003 | 1.80 | 0.18 | 0.32 | 0.035 | 0.0115 | 0.0009 | 0.0005 | | 0.04 | 2.23 | 3.34 |
| G | 0.42 | 0.08 | 0.75 | 0.007 | 0.004 | 1.30 | 0.30 | 0.30 | 0.040 | 0.0080 | 0.0008 | | 0.05 | | 1.99 | 3.56 |
| H | <u>0.21</u> | 0.17 | 0.47 | <u>0.019</u> | 0.005 | 1.16 | 0.34 | 0.30 | 0.033 | 0.0150 | 0.0008 | | | | 1.95 | 2.67 |
| I | 0.35 | 0.23 | 1.12 | 0.014 | <u>0.017</u> | 1.32 | 0.24 | 0.26 | 0.045 | 0.0170 | 0.0013 | | | | 1.79 | 3.71 |
| J | 0.41 | 0.09 | 0.82 | 0.008 | <u>0.004</u> | 0.32 | 0.12 | 0.22 | 0.036 | 0.0110 | 0.0009 | | | | <u>1.17</u> | 2.56 |
| K | 0.38 | 0.25 | 0.81 | 0.015 | 0.005 | 1.12 | 0.11 | | 0.032 | 0.0130 | 0.0008 | | | | <u>0.49</u> | 2.94 |
| L | 0.40 | 0.48 | 0.42 | 0.010 | 0.004 | 1.50 | <u>0.06</u> | <u>0.50</u> | 0.037 | 0.0100 | 0.0007 | | | | <u>2.87</u> | 3.45 |
| M | 0.39 | 0.35 | 0.82 | 0.011 | 0.004 | 0.55 | 0.23 | <u>0.85</u> | 0.037 | 0.0110 | 0.0009 | | | | <u>4.14</u> | 3.53 |
| N | <u>0.21</u> | 0.22 | 0.56 | 0.014 | 0.005 | 0.40 | 0.15 | 0.23 | 0.035 | 0.0100 | 0.0007 | | | | 1.26 | <u>1.92</u> |
| O | 0.35 | 0.41 | 0.78 | 0.012 | 0.005 | <u>0.28</u> | <u>0.08</u> | 0.35 | 0.045 | 0.0095 | 0.0009 | | 0.03 | | 1.72 | 2.54 |
| P | 0.42 | 0.32 | 0.40 | 0.008 | 0.004 | 1.90 | 0.34 | 0.38 | 0.037 | 0.0100 | 0.0007 | | | | <u>2.61</u> | 3.90 |
| Q | 0.26 | 0.12 | 0.48 | 0.009 | 0.005 | 0.40 | 0.15 | 0.23 | 0.035 | 0.0100 | 0.0007 | | | | 1.26 | <u>1.93</u> |

A blank column means that the element is not added intentionally.
An underlined figure means that the value is out of the scope of the present invention.

A blank column in Table 1 indicates that the element was not contained intentionally (that is, the content of the element was at an impurity level and substantially 0%). A molten steel was continuously cast to produce a bloom. The bloom was subjected to billeting to produce a billet having a rectangular cross section of 160 mm×160 mm. The billet was hot rolled to produce a steel bar of 60 mm diameter.

A part of the steel bar of 60 mm diameter was cut off. The cut-off part was subjected to hot extend forging to produce a steel bar of 30 mm diameter. The produced steel bar of 30 mm diameter was subjected to normalizing treatment. Specifically, the steel bar of 30 mm diameter was retained at 920° C. for 1 hour and thereafter air cooled.

The steel bar of 60 mm diameter and the steel bar of 30 mm diameter after normalizing treatment were subjected to spheroidizing annealing treatment. Specifically, each steel bar was retained at 760° C. for 4 hours, and thereafter cooled to 600° C. at a rate of 15° C./hour, thereafter being cooled to normal temperature.

[Evaluation Tests]

With the steel bars after spheroidizing annealing treatment as steel materials for carbonitrided bearing, hardenability, toughness, wear resistance, and surface-originated flaking life of each steel material were evaluated.

[Hardenability Evaluation Test]

A hardenability evaluation test was performed in the following way. A Jominy test specimen with a flange, which has a diameter of 25 mm and a length of 100 mm, was fabricated by machining from each steel bar of 30 mm diameter. Test specimens of each Test No. were subjected to the Jot/tiny test conforming to JIS G0561 (2010). After testing, hardenability was evaluated by hardness J11 at a position of 11 mm from the water cooling end. A steel material for bearing to be applied to large-sized carbonitrided bearing parts is required to have a hardness J11 of not less than 32 in Rockwell C hardness HRC. Therefore, in the hardenability test, it was judged that hardenability was high (denoted by "○" in Table 2) when hardness J11 was not less than 32, and hardenability was low (denoted by "x" in table 2) when hardness J11 was less than 32.

TABLE 2

| Test No. | Steel Type | fn1 | fn2 | Hardenability J11 HRC | Evaluation | Toughness vE$_{20}$ (J/cm$^2$) | σy (MPa) | Index | Evaluation | Wear resistance C concentration (%) | N concentration (%) | HRC |
|---|---|---|---|---|---|---|---|---|---|---|---|---|
| 1 | A | 2.23 | 3.41 | 34 | ○ | 76.0 | 718 | 1107 | ○ | 0.81 | 0.29 | 59 |
| 2 | B | 1.98 | 3.34 | 39 | ○ | 38.0 | 804 | 1157 | ○ | 0.81 | 0.30 | 60 |
| 3 | C | 2.25 | 3.24 | 35 | ○ | 44.0 | 781 | 1140 | ○ | 0.82 | 0.28 | 61 |
| 4 | D | 1.23 | 2.23 | 33 | ○ | 62.2 | 757 | 1145 | ○ | 0.80 | 0.32 | 60 |
| 5 | E | 2.56 | 4.00 | 41 | ○ | 44.0 | 774 | 1129 | ○ | 0.81 | 0.30 | 61 |
| 6 | F | 2.23 | 3.34 | 34 | ○ | 117.0 | 669 | 1077 | ○ | 0.79 | 0.32 | 59 |
| 7 | G | 1.99 | 3.56 | 40 | ○ | 37.0 | 812 | 1165 | ○ | 0.79 | 0.31 | 60 |
| 8 | H | 1.95 | 2.67 | 33 | ○ | 98.0 | 589 | <u>932</u> | X | 0.82 | 0.29 | 60 |
| 9 | I | 1.79 | 3.71 | 39 | ○ | 46.0 | 774 | 1134 | ○ | 0.80 | 0.28 | 61 |
| 10 | J | <u>1.17</u> | 2.56 | 34 | ○ | 33.0 | 808 | 1147 | ○ | 0.82 | 0.29 | 61 |
| 11 | K | <u>0.49</u> | 2.94 | 35 | ○ | 40.0 | 794 | 1148 | ○ | 0.81 | 0.31 | 61 |
| 12 | L | <u>2.87</u> | 3.45 | 37 | ○ | 14.0 | 721 | <u>939</u> | X | 0.80 | 0.32 | 60 |
| 13 | M | <u>4.14</u> | 3.53 | 39 | ○ | 12.0 | 718 | <u>921</u> | X | 0.82 | 0.30 | 61 |
| 14 | N | 1.26 | <u>1.92</u> | <u>28</u> | X | 113.0 | 611 | 980 | ○ | 0.81 | 0.29 | 60 |
| 15 | O | 1.72 | 2.54 | 33 | ○ | 39.0 | 742 | 1070 | ○ | 0.80 | 0.32 | 59 |
| 16 | P | <u>2.61</u> | 3.90 | 37 | ○ | 16.0 | 716 | <u>934</u> | X | 0.80 | 0.31 | 60 |
| 17 | Q | 1.26 | <u>1.93</u> | <u>29</u> | X | 108.0 | 608 | 985 | ○ | 0.81 | 0.30 | 60 |

| Test No. | Wear resistance Average wear depth (μm) | Evaluation | Rolling fatigue property C concentration (%) | N concentration (%) | HRC | L10 (×10$^6$ cycle) | Evaluation | Overall evaluation | Remarks |
|---|---|---|---|---|---|---|---|---|---|
| 1 | 6 | ○ | 0.81 | 0.30 | 60 | 21.0 | ○ | ○ | Inventive example |
| 2 | 3 | ○ | 0.80 | 0.30 | 61 | 42.0 | ○ | ○ | Inventive example |
| 3 | 4 | ○ | 0.81 | 0.29 | 60 | 30.0 | ○ | ○ | Inventive example |
| 4 | 7 | ○ | 0.80 | 0.31 | 60 | 40.0 | ○ | ○ | Inventive example |
| 5 | 4 | ○ | 0.81 | 0.29 | 61 | 38.0 | ○ | ○ | Inventive example |
| 6 | 6 | ○ | 0.80 | 0.32 | 60 | 60.0 | ○ | ○ | inventive example |
| 7 | 5 | ○ | 0.79 | 0.30 | 59 | 28.0 | ○ | ○ | Inventive example |
| 8 | 9 | ○ | 0.82 | 0.30 | 60 | 21.0 | ○ | X | Comparative example |
| 9 | 6 | ○ | 0.79 | 0.29 | 60 | <u>6.5</u> | X | X | Comparative example |
| 10 | <u>15</u> | X | 0.81 | 0.29 | 61 | 20.0 | ○ | X | Comparative example |
| 11 | <u>20</u> | X | 0.81 | 0.30 | 61 | 32.0 | ○ | X | Comparative example |
| 12 | 7 | ○ | 0.80 | 0.31 | 60 | <u>2.6</u> | X | X | Comparative example |

TABLE 2-continued

| 13 | 5 | ○ | 0.82 | 0.29 | 61 | <u>3.5</u> | X | X | Comparative example |
| 14 | 7 | ○ | 0.80 | 0.29 | 60 | 52.0 | ○ | X | Comparative example |
| 15 | <u>12</u> | X | 0.80 | 0.31 | 60 | 27.0 | ○ | X | Comparative example |
| 16 | 7 | ○ | 0.80 | 0.30 | 60 | <u>2.4</u> | X | X | Comparative example |
| 17 | 8 | ○ | 0.81 | 0.30 | 60 | 48.0 | ○ | X | Comparative example |

[Toughness Evaluation Test]

A toughness evaluation test was performed in the following way. A steel bar of 30 mm diameter of each Test No. was subjected to quenching and tempering of a heat pattern shown in FIG. 1. Referring to FIG. 1, in the quenching treatment, quenching temperature was 900° C. and retention time was 6 hours. The steel bar after elapse of the retention time was oil cooled (denoted by "OQ" in the figure). In the tempering treatment, the tempering temperature was 180° C., and the retention time was 2 hours. The steel bar after elapse of the retention time was air cooled (denoted by "AC" in the figure).

From the steel bar which has been subjected to the above described quenching and tempering, a Charpy test specimen having a V notch was sampled. Using this Charpy test specimen, the Charpy test conforming to JIS Z2242 (2009) was conducted at room temperature. Absorbed energy obtained by the test was divided by an original sectional area of the notched part (sectional area of the notched part of the test specimen before testing) to determine an impact value $vE_{20}$ (J/cm$^2$).

Further, a bar-type No. 4 tensile test specimen was sampled from the steel bar which had been subjected to the above described quenching and tempering. Using this test specimen, the tensile test conforming to JIS 22241 (2011) was conducted at room temperature in the atmosphere to determine 0.2% proof stress σy (MPa).

Using the obtained Charpy impact value $vE_{20}$ (J/cm$^2$) and 0.2% proof stress σy (MPa), an evaluation index Index of toughness was determined by the following formula:

$$\text{Index} = \sigma y \times (vE_{20})^{0.1}$$

To be applied to a large-sized carbonitrided bearing part, it is required for the steel material for bearing that the above described Index is not less than 950. Therefore, in the toughness evaluation test, it was judged that toughness was excellent (denoted by "○" in Table 2) when Index was not less than 950. On the other hand, it was judged that toughness was poor (denoted by "x" in table 2) when Index is less than 950.

[Wear Resistance Evaluation Test]

Figure 2:
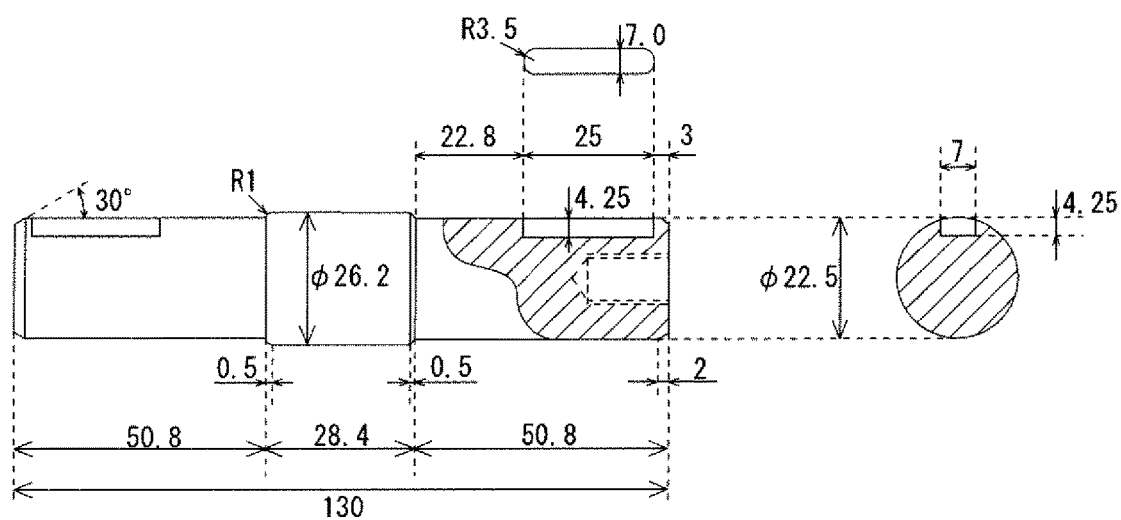
FIG. 2 is a side view and cross sectional view of an intermediate product of a small roller test specimen to be used in a roller pitting test.

A wear resistance evaluation test of carbonitrided bearing parts was performed in the following way. An intermediate product of a small roller test specimen shown in FIG. 2 was fabricated from a steel bar of 30 mm diameter. FIG. 2 is a side view and a cross sectional view to show a partial section of an intermediate product of the small roller test specimen. Numerals in FIG. 2 show dimensions (mm) of each area of the intermediate product.

Figure 3:
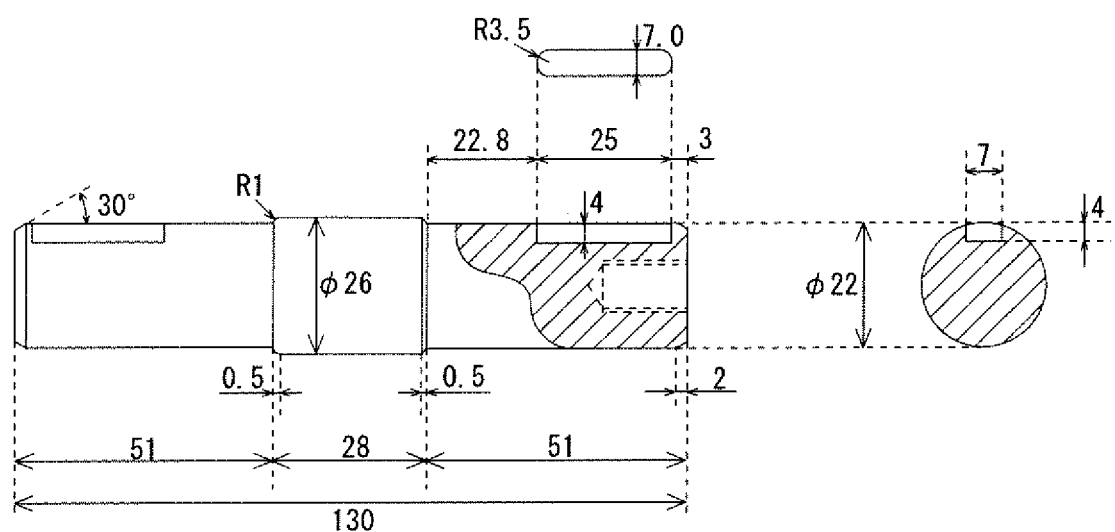
FIG. 3 is a side view and cross sectional view of the small roller test specimen produced from the intermediate product of FIG. 2.

The intermediate product was subjected to carbonitriding quenching and tempering to fabricate a small roller test specimen which imitated a carbonitrided bearing part. At this moment, the condition of carbonitriding quenching and tempering was adjusted such that in the small roller test specimen, the surface C concentration was 0.80%, the surface N concentration was 0.30%, and the surface hardness was 60 in the Rockwell C hardness HRC. Specifically, the carbonitriding quenching treatment was performed at conditions shown in Table 3, that is, carbon potential CP, ammonia concentration with respect to carburizing converted gas in the atmosphere, heating temperature (heating temperature=carbonitriding temperature=quenching temperature in the present embodiment), and retention time (=retention time at carbonitriding temperature+retention time at quenching temperature), and the cooling method was oil cooling. The tempering treatment was performed at the tempering temperature and the retention time shown in FIG. 2, and cooling after elapse of the retention time was air cooling. The intermediate product after carbonitriding quenching and tempering was subjected to finishing work (cutting) to be formed into a small roller test specimen having a shape shown in FIG. 3.

TABLE 3

| | | | | | Carbonitriding quenching | | | Tempering | |
| --- | --- | --- | --- | --- | --- | --- | --- | --- | --- |
| Test No. | Steel Type | fn1 | fn2 | CP | Ammonia concentration (%) | Heating temperature (° C.) | Retention time (minute) | Tempering temperature (° C.) | Retention time (minute) |
| 1 | A | 2.23 | 3.41 | 1.0 | 1.5 | 900 | 360 | 180 | 120 |
| 2 | B | 1.98 | 3.34 | 1.0 | 2.0 | 900 | 360 | 180 | 120 |
| 3 | C | 2.25 | 3.24 | 1.0 | 2.0 | 900 | 360 | 180 | 120 |
| 4 | D | 1.23 | 2.23 | 1.2 | 3.0 | 900 | 360 | 180 | 120 |
| 5 | E | 2.56 | 4.00 | 0.9 | 2.0 | 900 | 360 | 180 | 120 |
| 6 | F | 2.23 | 3.34 | 0.9 | 2.0 | 900 | 360 | 180 | 120 |
| 7 | G | 1.99 | 3.56 | 1.0 | 2.0 | 900 | 360 | 180 | 120 |
| 8 | H | 1.95 | 2.67 | 1.0 | 2.0 | 900 | 360 | 180 | 120 |
| 9 | I | 1.79 | 3.71 | 1.0 | 2.0 | 880 | 360 | 180 | 120 |
| 10 | J | <u>1.17</u> | 2.56 | 1.2 | 2.0 | 900 | 360 | 180 | 120 |
| 11 | K | <u>0.49</u> | 2.94 | 1.1 | 3.0 | 900 | 360 | 180 | 120 |
| 12 | L | <u>2.87</u> | 3.45 | 1.0 | 1.5 | 900 | 360 | 180 | 120 |

TABLE 3-continued

|  |  |  |  |  | Carbonitriding quenching | | | Tempering | |
|---|---|---|---|---|---|---|---|---|---|
| Test No. | Steel Type | fn1 | fn2 | CP | Ammonia concentration (%) | Heating temperature (° C.) | Retention time (minute) | Tempering temperature (° C.) | Retention time (minute) |
| 13 | M | 4.14 | 3.53 | 1.1 | 1.0 | 900 | 360 | 180 | 120 |
| 14 | N | 1.26 | 1.92 | 1.2 | 2.0 | 900 | 360 | 180 | 120 |
| 15 | O | 1.72 | 2.54 | 1.2 | 2.0 | 900 | 360 | 180 | 120 |
| 16 | P | 2.61 | 3.90 | 1.0 | 2.0 | 900 | 360 | 180 | 120 |
| 17 | Q | 1.26 | 1.93 | 1.0 | 2.0 | 900 | 360 | 180 | 120 |

As the wear resistance evaluation test, a roller pitting test (two-cylinder rolling fatigue test) was performed by using the small roller test specimen. In the roller pitting test, a large roller test specimen having a disc shape of 150 mm diameter, along with the small roller specimen, was prepared. The starting material of the large roller test specimen corresponded to high carbon chromium bearing steel SUJ2 specified in JIS G4805 (2008). The circumferential surface of the large roller test specimen was brought into contact with the surface of the part of 26.0 mm diameter of the small roller test specimen (hereinafter, referred to as a test portion) to perform the roller pitting test.

The conditions of the roller pitting test were as follows. The interfacial pressure between the small roller test specimen and the large roller test specimen under a lubricated environment was 3.0 GPa. The rotational speed of the small roller test specimen was 1500 rpm and the slip rate thereof was 40%. The test was performed up to a number of cycles of $2 \times 10^7$.

After test, roughness of a sliding portion of the test part of the small roller test specimen was measured in the axial direction. Specifically, in the sliding portion, a roughness profile was measured at 4 locations at a 90° pitch in the circumferential direction. A maximum depth of the roughness profile at each of the 4 locations described above was defined as a wear depth, and an average of wear depths of these 4 locations was defined as an average wear depth (μm). It was judged that wear resistance was excellent (denoted by "○" in Table 2) when the average wear depth was not more than 10 μm. On the other hand, it was judged that wear resistance was poor (denoted by "x" in table 2) when the average wear depth was more than 10 μm.

[Surface Hardness]

In a region other than the sliding portion (hereinafter, referred to as a non-sliding portion) of the surfaces of the test part of the small roller test specimen after test, measurement positions of 4 locations were determined at a 90° pitch in the circumferential direction. At measurement positions of thus determined 4 locations, the Rockwell hardness test using the C scale was performed conforming to JIS Z2245 (2011). An average of Rockwell C hardness HRC at each measurement location was defined as Rockwell C hardness HRC at surface.

[Surface C Concentration and Surface N Concentration]

The non-sliding portion of the test part of the small roller test specimen was cut vertically with respect to the axial direction. A test specimen including a cutting face including the non-sliding portion was sampled, and the cutting face was embedded and finished by polishing. Thereafter, by using an electron probe micro-analyzer (EPMA), the C concentration and N concentration were measured at a 0.1 μm pitch from the surface of the non-sliding portion to a depth of 10 μm. Average values of the measured values were defined as a surface C concentration (mass %) and a surface N concentration (mass %), respectively.

[Surface-Originated Flaking Life Evaluation Test]

A surface-originated flaking life evaluation test was performed in the following way. A steel bar of 60 mm diameter was sliced to sample a disc-shaped rough test specimen which had a diameter of 60 mm and a thickness of 5.5 mm. The thickness (5.5 mm) of the rough test specimen corresponded to the lengthwise direction of the steel bar.

The rough test specimen was subjected to carbonitriding quenching and tempering to produce a test specimen which imitated a carbonitrided bearing part. At this moment, the carbonitriding quenching and tempering was performed at the conditions shown in Table 3 described above such that the surface C concentration was 0.80%, the surface N concentration was 0.30%, and the surface Rockwell C hardness HRC was 60. The surface of the obtained test specimen was subjected to lapping to provide a rolling fatigue test specimen.

The rolling fatigue test was performed by using a thrust-type rolling fatigue test machine. The maximum contact interfacial pressure at the time of test was 5.2 GPa, and a repetition rate was 1800 cpm (cycle per minute). The lubrication oil used at the time of test was admixed with gas atomized powder of high speed steel, which was classified into Vickers hardness of 750 (Hv) and a particle size of 100 to 180 μm, as foreign matter. The amount of admixing of the gas atomized powder was 0.02% with respect to the lubricant oil. As the steel ball used at the time of test, a thermally refined material of SUJ2 specified in MS G 4805 (2008) was used.

Results of the rolling fatigue test were plotted on the Weibull probability paper, and L10 life which indicates 10% failure probability was defined as a "surface-originated flaking life". Under a severe use environment (main test) in which foreign matter is admixed, it was judged that the surface-originated flaking life was excellent (denoted by "○" in Table 2) when L10 life is not less than $7.0 \times 10^5$. On the other hand, it was judged that the surface-originated flaking life was poor (denoted by "x" in table 2) when L10 life is less than $7.0 \times 10^5$.

[Test Results]

Table 2 shows test results. Referring to Table 2, the chemical compositions of the steel material for bearing of Test Nos. 1 to 7 were appropriate, and satisfied Formulae (1) and (2). For that reason, the steel materials of these Test Nos. exhibited high hardenability, as well as high toughness after quenching and tempering.

Further, in each of the carbonitrided bearing parts, which were produced by subjecting the steel materials for bearing of Test Nos. 1 to 7 to carbonitriding quenching and tempering, the chemical composition was appropriate and satisfied Formulae (1) and (2), the surface C concentration was 0.7 to 1.2%, the surface N concentration was 0.15 to 0.6%, and the surface hardness HRC was in a range of 58 to 65. Thus, excellent wear resistance and excellent surface-originated flaking life were exhibited.

On the other hand, in Test No. 8, the P content was too high. For that reason, the toughness after quenching and tempering was low.

In Test No. 9, the S content was too high. For that reason, the L10 life was less than $7.0 \times 10^5$, thus indicating a short surface-originated flaking life of the carbonitrided bearing part. This was considered to be caused by formation of coarse sulfides.

In Test No. 10, fn1 was too low. For that reason, the average wear depth was more than 10 μm, indicating low wear resistance of the carbonitrided bearing part.

In Test No. 11, V was not contained. For that reason, the average wear depth was more than 10 μm, indicating low wear resistance of the carbonitrided bearing part.

In Test No. 12, the Mo content was too low and the V content was too high, resulting in excessively high fn1. As a result of that, the toughness and the surface-originated flaking life were low.

In Test No. 13, the V content was too high, resulting in excessively high fn1. As a result of that, the toughness and the surface-originated flaking life were low.

In Test No. 14, fn2 was too low. As a result of that, the hardness J11 was less than 32, indicating low hardenability.

In Test No. 15, the Cr content was too low and the Mo content was too low. As a result of that, the average wear depth was more than 10 μm, indicating low wear resistance of the carbonitrided bearing part.

In Test No. 16, fn1 was too high. As a result of that, Index was less than 950, indicating low toughness. Further the L10 life was less than $7.0 \times 10^5$, thus indicating a short surface-originated flaking life of the carbonitrided bearing part.

In Test No. 17, fn2 was too low. As a result of that, the hardness J11 was less than 32, indicating low hardenability.

So far, embodiments of the present invention have been described. However, the above described embodiments are merely exemplification for carrying out the present invention. Therefore, the present invention will not be limited to the above described embodiments, and can be carried out by appropriately modifying the above described embodiments within a range not departing from the spirit thereof.

The invention claimed is:

1. A steel for carbonitrided bearing, comprising
a chemical composition consisting of, in mass %,
C: 0.25 to 0.45%,
Si: not more than 0.50%,
Mn: 0.40 to 1.50%,
P: not more than 0.015%,
S: not more than 0.005%,
Cr: 0.30 to 2.0%,
Mo: 0.10 to 0.35%,
V: 0.20 to 0.40%,
Al: 0.005 to 0.10%,
N: not more than 0.030%,
O: not more than 0.0015%,
B: 0 to 0.0050%,
Nb: 0 to 0.10%, and
Ti: 0 to 0.10%, with the balance being Fe and impurities, and satisfies Formulae (1) and (2):

$$1.20 < 0.4Cr + 0.4Mo + 4.5V < 2.60 \tag{1}$$

$$2.7C + 0.4Si + Mn + 0.8Cr + Mo + V > 2.20 \tag{2}$$

where each symbol of element in Formulae (1) and (2) is substituted by a content (mass %) of a corresponding element.

2. The steel for carbonitrided bearing according to claim 1, wherein the chemical composition further contains one or more kinds selected from the group consisting of:
B: 0.0003 to 0.0050%,
Nb: 0,005 to 0.10%, and
Ti: 0.005 to 0.10%.

3. The steel for carbonitrided bearing according to claim 1, wherein L10 life is not less than $7.0 \times 10^5$, where the L10 life indicates 10% failure probability, when a rolling fatigue test is performed by using a thrust-type rolling fatigue test machine, and a maximum contact interfacial pressure at a time of test is 5.0 GPa, and a repetition rate is 1800 cycle per minute, and a lubrication oil used at the time of test is admixed with gas atomized powder of high speed steel, which is classified into Vickers hardness of 750 (Hv) and a particle size of 100 to 180 μm.

4. The steel for carbonitrided bearing according to claim 1, wherein
an evaluation index Index of toughness is not less than 950, wherein
the evaluation index Index of toughness is determined by Formula (3):

$$\text{Index} = \sigma y \times (vE_{20})^{0.1} \tag{3}$$

where σy is 0.2% proof stress determined by a tensile test conforming to JIS Z2241 (2011) at room temperature, and $vE_{20}$ is an impact value determined by dividing an absorbed energy by an original sectional area of a notched part of a Charpy test specimen, where the absorbed energy is obtained by a Charpy test conforming to JIS Z2242 (2009) at room temperature.

* * * * *